(12) United States Patent
Tanaka (10) Patent No.: US 8,985,787 B2
(45) Date of Patent: Mar. 24, 2015

(54) PROJECTOR

(75) Inventor: Katsumi Tanaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/337,760

(22) Filed: Dec. 27, 2011

(65) Prior Publication Data

US 2012/0182526 A1 Jul. 19, 2012

(30) Foreign Application Priority Data

Jan. 17, 2011 (JP) ................................. 2011-006677

(51) Int. Cl.
*G03B 21/14* (2006.01)
*G03B 21/20* (2006.01)
*H04N 9/31* (2006.01)

(52) U.S. Cl.
CPC ............ *G03B 21/208* (2013.01); *H04N 9/3152* (2013.01); *G03B 21/2046* (2013.01)
USPC ............................................ 353/101; 353/38

(58) Field of Classification Search
CPC ............................. G03B 21/14; G02F 1/13335
USPC ...................................... 353/38, 101; 362/309
See application file for complete search history.

(56) References Cited

U.S. PATENT DOCUMENTS

| | | | |
|---|---|---|---|
| 7,040,761 B2 * | 5/2006 | Okuyama et al. | 353/38 |
| 7,216,991 B2 * | 5/2007 | Yamakawa | 353/87 |
| 7,575,326 B2 | 8/2009 | Nishida et al. | |
| 2005/0162619 A1 * | 7/2005 | Hamaya | 353/69 |
| 2006/0044525 A1 * | 3/2006 | Lee et al. | 353/81 |
| 2006/0290903 A1 | 12/2006 | Inoko et al. | |
| 2007/0195273 A1 | 8/2007 | Nishida et al. | |

FOREIGN PATENT DOCUMENTS

| | | |
|---|---|---|
| JP | A-2007-3744 | 1/2007 |
| JP | A-2007-219442 | 8/2007 |
| JP | A-2008-170761 | 7/2008 |

\* cited by examiner

*Primary Examiner* — William C Dowling
*Assistant Examiner* — Jerry Brooks
(74) *Attorney, Agent, or Firm* — Oliff PLC (57) ABSTRACT

A projector includes an illumination device including a light source that outputs light from a light emitting part, a first lens array having plural first small lenses, a second lens array having plural second small lenses corresponding to the plural first small lenses, and a superimposing lens that superimposes lights from the second lens array, a light modulation device that modulates light from the illumination device in response to image information, and a projection optical system that projects the light from the light modulation device on a projection target, wherein radii of curvature of the first small lenses are set with respect to each first small lens.

5 Claims, 4 Drawing Sheets

FIG. 1

| a-1 | b-1 | c-1 | d-1 | e-1 | f-1 |
|-----|-----|-----|-----|-----|-----|
| a-2 | b-2 | c-2 | d-2 | e-2 | f-2 |
| a-3 | b-3 | c-3 | d-3 | e-3 | f-3 |
| a-4 | b-4 | c-4 | d-4 | e-4 | f-4 |
| a-5 | b-5 | c-5 | d-5 | e-5 | f-5 |
| a-6 | b-6 | c-6 | d-6 | e-6 | f-6 |
| a-7 | b-7 | c-7 | d-7 | e-7 | f-7 |
| a-8 | b-8 | c-8 | d-8 | e-8 | f-8 |

PROJECTOR

BACKGROUND

1. Technical Field

The present invention relates to a projector.

2. Related Art

In related art, a projector including an illumination device having a light source that outputs light from a light emitting part, a first lens array having plural first small lenses, a second lens array having plural second small lenses corresponding to the plural first small lenses, and a superimposing lens that superimposes lights from the second lens array, a light modulation device that modulates light from the illumination device in response to image information, and a projection optical system that projects the light from the light modulation device on a projection target has been known (for example, see Patent Document 1 (JP-A-2007-219442)).

According to the projector in related art, since the first lens array having the plural first small lenses, the second lens array having the plural second small lenses corresponding to the plural first small lenses, and the superimposing lens that superimposes lights from the second lens array are provided, after the in-plane light intensity distribution of the light from the light source is uniformized, the light may be allowed to enter the light modulation device. As a result, a projection image with little brightness irregularities can be projected.

In the technical field of the projector, a projector that can project a projection image with less brightness irregularities is constantly required.

SUMMARY

An advantage of some aspects of the invention is to provide a projector that can project a projection image with less brightness irregularities than those in related art.

The inventors of the invention have found that displacement of a light emitting part (microscopic shift from the ideal position) produced due to aged deterioration, vibration, or the like contributes to increase in brightness irregularities as a result of diligent researches. Then, with further diligent researches, they have thought of reduction of "the in-plane light intensity irregularities of light applied to the light modulation devices due to displacement of the light emitting part" by setting radii of curvature of the first small lenses with respect to each first small lens and have completed the invention. The invention includes the following aspects.

1. A projector according to an aspect of the invention includes an illumination device including a light source that outputs light from a light emitting part, a first lens array having plural first small lenses, a second lens array having plural second small lenses corresponding to the plural first small lenses, and a superimposing lens that superimposes lights from the second lens array, a light modulation device that modulates light from the illumination device in response to image information, and a projection optical system that projects the light from the light modulation device on a projection target, wherein radii of curvature of the first small lenses are set with respect to each first small lens.

Accordingly, according to the projector of the aspect of the invention, since the first lens array having the plural first small lenses, the second lens array having the plural second small lenses corresponding to the plural first small lenses, and the superimposing lens that superimposes the lights from the second lens array are provided like the projector in related art, after the in-plane light intensity distribution of the light from the illumination device is uniformized, the light can be allowed to enter the light modulation device, and, as a result, a projection image with little brightness irregularities can be projected.

Further, according to the projector of the aspect of the invention, since the radii of curvature of the first small lenses are set with respect to each first small lens, "the in-plane light intensity irregularities of light applied to the light modulation device due to displacement of the light emitting part" can be reduced by setting radii of curvature of the first small lenses with respect to each first small lens, and, as a result, a projection image with less brightness irregularities than that in related art can be projected.

Note that "the radii of curvature of the first small lenses are set with respect to each first small lens" does not only mean that all of the respective radii of curvature of the first small lenses are set to be different, but may mean that the radii of curvature of two or more first small lenses are set to be the same as long as the setting is effective for reduction of "the in-plane light intensity irregularities of light applied to the light modulation device due to displacement of the light emitting part".

2. In the projector of the aspect of the invention, it is preferable that the light emitting part outputs light containing red light, green light, and blue light, three light modulation devices that respectively modulate the red light, the green light, and the blue light are provided as the light modulation device, a guiding optical system that guides the red light, the green light, and the blue light to the three light modulation devices is further provided, and the lights are projected on the projection target with an in-plane light intensity distribution of one color light of the red light, the green light, and the blue light inverted relative to in-plane light intensity distributions of the other color lights.

Incidentally, the projector including the three light modulation devices that respectively modulate the red light, the green light, and the blue light and the guiding optical system that guides the red light, the green light, and the blue light to the three light modulation devices is widely known, and, in the projector, the lights are generally projected on the projection target (screen or the like) with the in-plane light intensity distribution of one color light of the red light, the green light, and the blue light inverted relative to in-plane light intensity distributions of the other color lights. In the projector, the brightness irregularities due to displacement of the light emitting part are produced with respect to each color light, and color irregularities are produced in the projection image.

On the other hand, according to the projector of the aspect of the invention, the brightness irregularities produced with respect to each color light can be reduced, and, as a result, a projection image with little color irregularities can be projected.

3. In the projector of the aspect of the invention, it is preferable that the light source includes an arc tube that contains the light emitting part.

The arc tube has high intensity, but displacement of the light emitting part tends to occur due to aged deterioration etc., however, according to the above described configuration, even the projector having the arc tube can reduce the influences by aged deterioration etc. and project a projection image with less brightness irregularities.

As the arc tube, for example, a metal halide lamp, a high-pressure mercury lamp, an ultra-high pressure mercury lamp, or the like may be preferably employed.

4. In the projector of the aspect of the invention, it is preferable that the first small lens is a plano-convex lens having a spherical curved surface.

According to the configuration, the design of the first lens array is easier than in a projector using a first small lens having other shapes (for example, a first small lens of a biconvex lens or a first small lens of a plano-convex lens having the aspherical curved surface).

5. In the projector of the aspect of the invention, it is preferable that the first small lens is a plano-convex lens, the plural first small lenses are arranged in a matrix, and a curved surface of the plano-convex lens is a curved surface for which a radius of curvature in a row direction and a radius of curvature in a column direction are separately set.

According to the configuration, "the in-plane light intensity irregularities of light applied to the light modulation devices due to displacement of the light emitting part" can be reduced by setting the radii of curvature with respect to both directions of the row direction and the column direction, and, as a result, a projection image with less brightness irregularities can be projected.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a projector according to the invention will be explained according to embodiments shown in the drawings.

Embodiment

Figure 1:
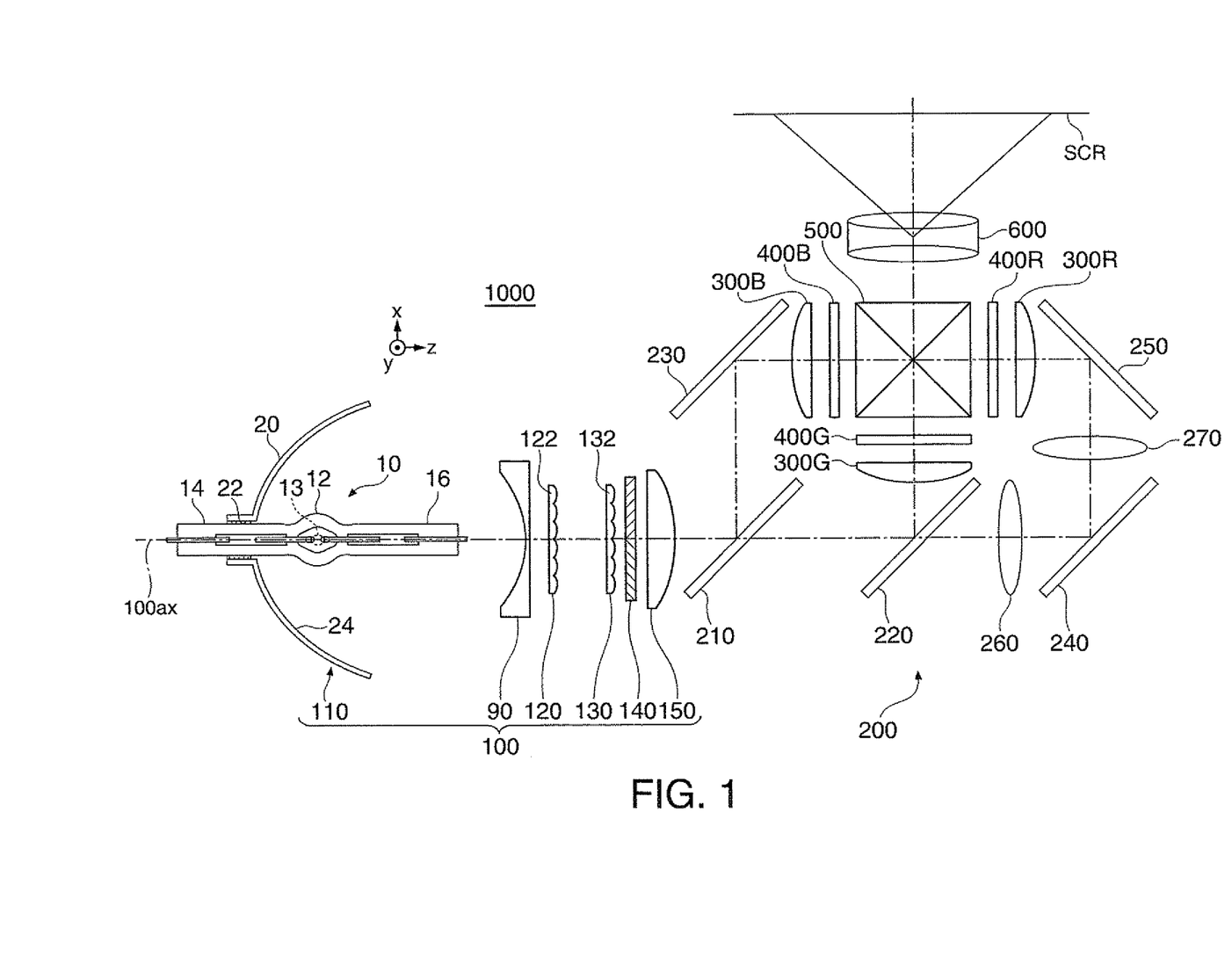
FIG. 1 is a plan view showing an optical system of a projector 1000 according to an embodiment.

FIG. 1 is a plan view showing an optical system of a projector 1000 according to an embodiment. Note that, in FIG. 1, a light source 110 is shown in a sectional view.

Figure 2:
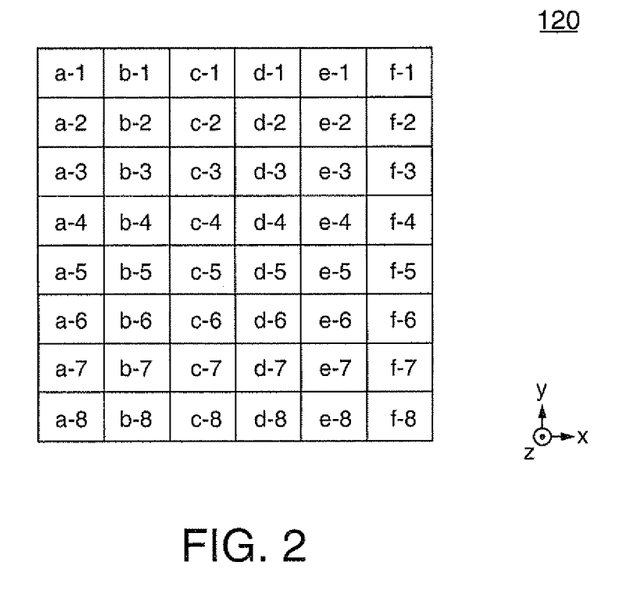
FIG. 2 shows a first lens array 120 in the embodiment seen from a second lens array 130 side.

FIG. 2 shows a first lens array 120 in the embodiment seen from a second lens array 130 side. Note that numerals (small lens numbers) of a-1 to f-8 denoting the respective first small lenses 122 (the sign is not shown) are signs for distinguishing the respective first small lenses 122, not actually assigned to the lenses.

FIGS. 1 and 2 are schematic diagrams and the shapes of the optical elements in the drawings are not necessarily realistic.

Note that, in the following explanation, three directions orthogonal to one another are referred to as a z-axis direction (an illumination optical axis 100ax direction in FIG. 1), an x-axis direction (a direction in parallel to a paper surface and perpendicular to the z-axis in FIG. 1), and a y-axis direction (a direction perpendicular to the paper surface and perpendicular to the z-axis in FIG. 1).

As shown in FIG. 1, the projector 1000 according to embodiment 1 includes an illumination device 100, a color separation and guiding system 200, three liquid crystal light modulation devices 400R, 400G, 400B that respectively modulate red light, green light, and blue light, a cross dichroic prism 500, and a projection system 600.

The illumination device 100 includes the light source 110, a concave lens 90, the first lens array 120, the second lens array 130, a polarization conversion element 140, and a superimposing lens 150. The illumination device 100 outputs light containing red light, green light, and blue light (i.e., light used as white light) as illumination light along the illumination optical axis 100ax.

As shown in FIG. 1, the light source 110 includes an arc tube 10 and a reflector 20. The light source 110 outputs light from a light emitting part 13, which will be described later, as converging light with the illumination optical axis 100ax as a center axis to an illuminated region side.

The arc tube 10 has a vessel part 12 containing the light emitting part 13, a pair of sealing parts 14, 16 extending to both sides of the vessel part 12, a pair of electrodes provided along the illumination optical axis 100ax, a pair of metal foils respectively sealed within the pair of sealing parts 14, 16, and a pair of lead wires respectively electrically connected to the pair of metal foils. As the arc tube 10, various arc tubes that emits high-intensity light may be employed, and, for example, a metal halide lamp, high-pressure mercury lamp, an ultra-high pressure mercury lamp, or the like may be employed. The light emitting part 13 is located near the primary focal point of a reflection surface 24, which will be described later. The light emitting part 13 outputs light containing red light, green light, and blue light.

The condition etc. of the component elements of the arc tube 10 will be illustratively shown as below. The vessel part 12 and the sealing parts 14, 16 include quartz glass, for example, and mercury, an inert gas, and a small amount of halogen are sealed within the vessel part 12. The electrodes are tungsten electrodes, for example, and the metal foils are molybdenum foils, for example. The lead wires include molybdenum or tungsten, for example.

The reflector 20 is provided in the first sealing part 14 of one of the pair of sealing parts 14, 16 and reflects the light output from the light emitting part 13 toward the illuminated region. The reflector 20 has an opening part 22 for inserting and fixing the first sealing part 14 of the arc tube 10, and the reflection surface 24 that reflects the light toward the illuminated region side. The reflection surface 24 is an ellipsoidal surface and reflects the light output from the light emitting part 13 located near the primary focal point as converging light converging around the secondary focal point at the illuminated region side. The reflector 20 is provided in the first sealing part 14 using an inorganic adhesive such as cement filling the opening part 22.

As a material for the base material forming the reflection surface 24, for example, crystallized glass, alumina ($Al_2O_3$), or the like may be preferably used. On the inner surface of the reflection surface 24, for example, a visible light reflection layer including a dielectric multilayer of titanium oxide ($TiO_2$) and silicon oxide ($SiO_2$) is formed.

The concave lens 90 outputs the converging light from the light source 110 as nearly parallel light. The concave lens 90 is provided at the illuminated region side of the reflector 20 as shown in FIG. 1. Further, the light from the reflector 20 is output toward the first lens array 120.

The first lens array 120, the second lens array 130, and the superimposing lens 150 form a light uniformizing optical system that uniformizes the in-plane light intensity distributions of lights incident to the light modulation devices.

As shown in FIGS. 1 and 2, the first lens array 120 has the plural first small lenses 122 for dividing the light from the concave lens 90 into plural partial luminous fluxes. The first lens array 120 has a function as a luminous flux division optical element that divides the light from the light source 110 into plural partial luminous fluxes, and has a configuration in which the plural first small lenses 122 are arranged in a matrix with eight rows and six columns within a plane orthogonal to the illumination optical axis 100ax. Though the detailed explanation is omitted, the outer shape of the first small lens 122 (a rectangle of lateral:longitudinal (x-axis direction:y-axis direction)=4:3) is a nearly similarity shape with respect to the outer shapes of image formation regions of the liquid crystal light modulation devices 400R, 400G, 400B. The radii of curvature of the first small lenses 122 are set with respect to each first small lens 122 (a-1 to f-8). The first small lens 122 is a plano-convex lens having a spherical curved surface.

The radii of curvature of the respective first small lenses 122 may be set based on a result of determination of the radii of curvature of the respective first small lenses 122 that can reduce "the in-plane light intensity irregularities of light applied to the light modulation devices due to displacement of the light emitting part 13" by doing a simulation, for example.

The second lens array 130 has plural second small lenses 132 corresponding to the plural first small lenses 122 of the first lens array 120. The second lens array 130 has a function of focusing images of the respective first small lenses 122 near the image formation regions of the liquid crystal light modulation devices 400R, 400G, 400B with the superimposing lens 150. The second lens array 130 has a configuration in which the second small lenses 132 are arranged in a matrix with eight rows and six columns within the plane orthogonal to the illumination optical axis 100ax.

The polarization conversion element 140 is a polarization conversion element that outputs the respective partial luminous fluxes divided by the first lens array 120 as nearly one kind of linearly-polarized light in the same polarization direction.

The polarization conversion element 140 has a polarized light separation layer that transmits one linearly-polarized component of the polarized components contained in the light from the light source 110 and reflects the other linearly-polarized component in a direction perpendicular to the illumination optical axis 100ax, a reflection layer that reflects the other linearly-polarized component reflected by the polarized light separation layer in a direction in parallel to the illumination optical axis 100ax, and a retardation film that converts the other linearly-polarized component reflected by the reflection layer into the one linearly-polarized component.

The superimposing lens 150 is an optical element that collects the respective partial luminous fluxes from the polarization conversion element 140 (the light originally from the second lens array 130) and superimposes them near the image formation regions of the liquid crystal light modulation devices 400R, 400G, 400B. The superimposing lens 150 is provided so that the optical axis of the superimposing lens 150 and the illumination optical axis 100ax may be nearly aligned. Note that the superimposing lens may be formed by a compound lens with combined plural lenses.

The color separation and guiding optical system 200 includes dichroic mirrors 210, 220, reflection mirrors 230, 240, 250, and relay lenses 260, 270. The color separation and guiding optical system 200 has a function of separating the light from the illumination device 100 into red light, green light, and blue light and guiding the red light, the green light, and the blue light to the liquid crystal light modulation devices 400R, 400G, 400B to be illuminated, respectively, as a guiding optical system.

Collecting lenses 300R, 300G, 300B are provided between the color separation and guiding optical system 200 and the liquid crystal light modulation devices 400R, 400G, 400B.

The dichroic mirrors 210, 220 have wavelength-selective transmission films that reflect lights in predetermined wavelength regions and transmit lights in other wavelength regions formed on substrates.

The dichroic mirror 210 reflects a blue light component and transmits a red light component and a green light component.

The dichroic mirror 220 reflects the green light component and transmits the red light component.

The blue light reflected by the dichroic mirror 210 is further reflected by the reflection mirror 230, transmitted through the collecting lens 300B, and enters the image formation region of the liquid crystal light modulation device 400B for blue light.

The green light transmitted through the dichroic mirror 210 with the red light is reflected by the dichroic mirror 220, transmitted through the collecting lens 300G, and enters the image formation region of the liquid crystal light modulation device 400G for green light.

The red light transmitted through the dichroic mirror 220 enters the image formation region of the liquid crystal light modulation device 400R for red light through the relay lens 260, the reflection mirror 240 at the incident side, the relay lens 270, the reflection mirror 250 at the exit side, and the collecting lens 300R. The relay lenses 260, 270 and the reflection mirrors 240, 250 have a function of guiding the red light component transmitted through the dichroic mirror 220 to the liquid crystal light modulation device 400R.

Since the optical path of the red light is longer and the red light enters the liquid crystal light modulation device 400R through the relay lenses 260, 270, the projector 1000 projects the lights with the in-plane light intensity distribution of the red light inverted vertically (in the y-axis direction) and horizontally (in the x-axis direction) relative to the in-plane light intensity distributions of the other color lights (the green light and the blue light) on the screen SCR.

Note that the relay lenses 260, 270 are provided in the optical path of the red light for prevention of reduction of light use efficiency due to diverging light or the like because the length of the optical path of the red light is longer than the lengths of the optical paths of the other color lights. In the projector 1000 according to the embodiment, the configuration is employed because the length of the optical path of the red light is longer, however, for example, a configuration in which the length of the optical path of the blue light is made longer and the relay lenses and the reflection mirrors are used for the optical path of the blue light is conceivable.

The liquid crystal light modulation devices 400R, 400G, 400B are light modulation devices that modulate light from the illumination device 100 in response to image information, and modulate incident color lights in response to the image information and form a color image. Note that, though illustration is omitted, light incident-side polarizers are respectively provided between the collecting lenses 300R, 300G, 300B and the liquid crystal light modulation devices 400R, 400G, 400B, and light exiting-side polarizers are respectively provided between the liquid crystal light modulation devices 400R, 400G, 400B and the cross dichroic prism 500. The light modulation of the respective incident color lights is performed by these light incident-side polarizers, respective liquid crystal light modulation devices, and light exiting-side polarizers.

The respective liquid crystal light modulation devices are transmissive liquid crystal light modulation devices in which liquid crystal as an electrooptic material is closely sealed between a pair of transparent glass substrates, and modulate the polarization direction of one kind of linearly polarized light output from the light incident-side polarizers in response to provided image signals using polysilicon TFTs as switching elements, for example. The outer shape of the image formation region in each liquid crystal light modulation device is a rectangular shape of lateral:longitudinal (x-axis direction:y-axis direction)=4:3.

The cross dichroic prism 500 is an optical element that combines optical images modulated with respect to each color light output from the light exiting-side polarizers and forms a color image. The cross dichroic prism 500 has a nearly square shape in a plan view formed by bonding four right angle prisms, and dielectric multilayer films are formed on nearly X-shaped interfaces formed by bonding the right angle prisms. The dielectric multilayer film formed on one of the nearly X-shaped interfaces reflects red light and the dielectric multilayer film formed on the other interface reflects blue light. The red light and the blue light are bent by the dielectric multilayer films and aligned in the traveling direction of the green light, and the three color lights are combined.

The color image output from the cross dichroic prism 500 is projected by the projection system 600 and forms an image on the screen SCR as a projection target.

Next, advantages of the projector 1000 according to the embodiment will be explained.

According to the projector 1000 of the embodiment, since the first lens array 120 having the plural first small lenses 122, the second lens array 130 having the plural second small lenses 132 corresponding to the plural first small lenses 122, and the superimposing lens 150 that superimposes the lights from the second lens array 130 are provided like the projector in related art, after the in-plane light intensity distribution of the light from the light source 110 is uniformized, the light can be allowed to enter the respective liquid crystal light modulation devices, and, as a result, a projection image with little brightness irregularities can be projected.

Further, according to the projector 1000 of the embodiment, since the radii of curvature of the first small lenses 122 are set with respect to each first small lens 122, "the in-plane light intensity irregularities of light applied to the light modulation devices due to displacement of the light emitting part 13" can be reduced by setting radii of curvature of the first small lenses with respect to each first small lens, and, as a result, a projection image with less brightness irregularities can be projected.

Further, according to the projector 1000 of the embodiment, since the light emitting part 13 outputs light containing red light, green light, and blue light, the three liquid crystal light modulation devices (liquid crystal light modulation devices 400R, 400G, 400B) that respectively modulate the red light, the green light, and the blue light are provided as the light modulation device, the guiding optical system (color separation and guiding system 200) that guides the red light, the green light, and the blue light to the three liquid crystal light modulation devices is further provided, and the lights are projected on the projection target (screen SCR) with the in-plane light intensity distribution of the red light inverted relative to the in-plane light intensity distributions of the other color lights, brightness irregularities produced with respect to each color light can be reduced, and, as a result, a projection image with little color irregularities can be projected.

Moreover, according to the projector 1000 of the embodiment, even with the projector 1000 having the arc tube 10, influences by aged deterioration etc. can be reduced and a projection image with less brightness irregularities can be projected.

In addition, according to the projector 1000 of the embodiment, since the first small lens 122 is the plano-convex lens having the spherical curved surface, the design of the first lens array 120 is easier than that in a projector using first small lenses having other shapes (for example, a first small lens of a biconvex lens or a first small lens of a plano-convex lens having the aspherical curved surface).

Test Examples

Figure 3:
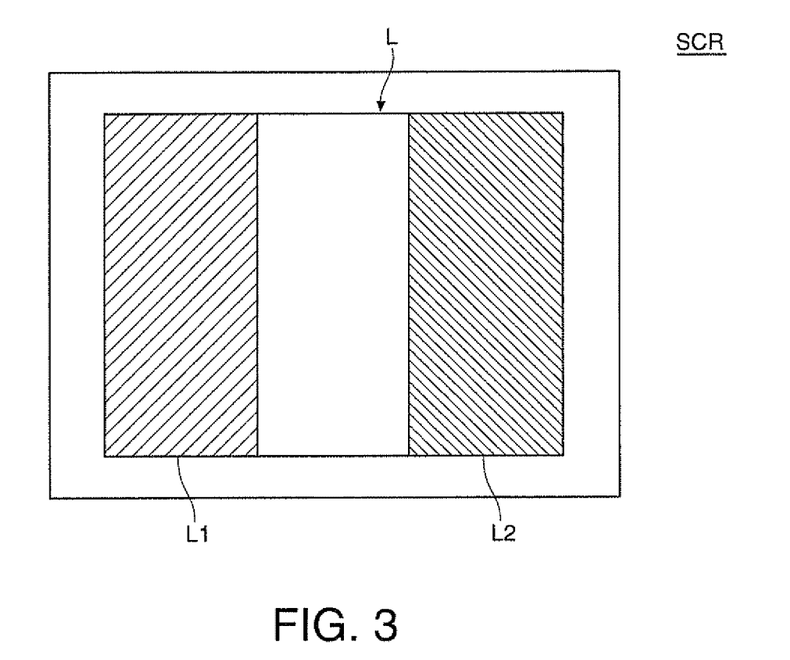
FIG. 3 is a diagram for explanation of a horizontal illuminance ratio.

FIG. 3 is a diagram for explanation of a horizontal illuminance ratio.

Figure 4:
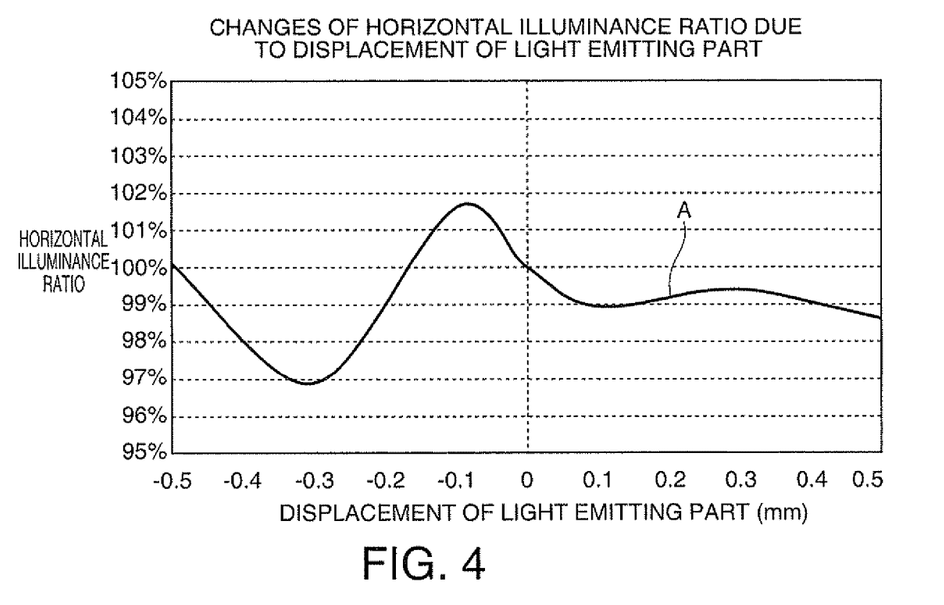
FIG. 4 is a graph showing changes of a horizontal illuminance ratio due to displacement of a light emitting part in a projector 1000a according to a test example.

FIG. 4 is a graph showing changes of a horizontal illuminance ratio due to displacement of a light emitting part in a projector 1000a according to a test example.

Figure 5:
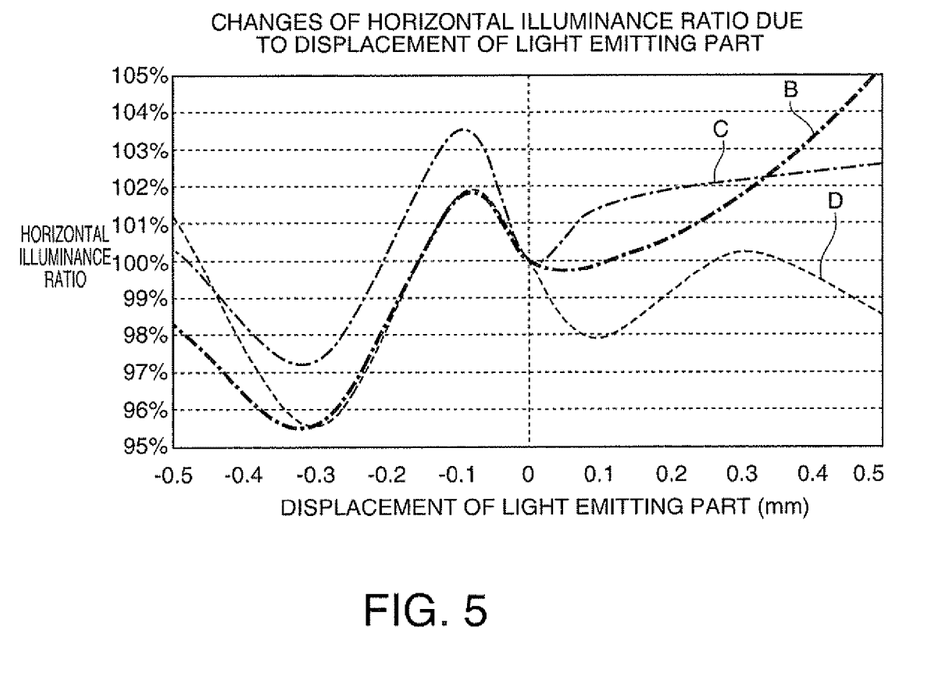
FIG. 5 is a graph showing changes of horizontal illuminance ratios due to displacement of light emitting parts in projectors 1000b, 1000c, 1000d according to test examples.

FIG. 5 is a graph showing changes of horizontal illuminance ratios due to displacement of light emitting parts in projectors 1000b, 1000c, 1000d according to test examples.

Figure 6:
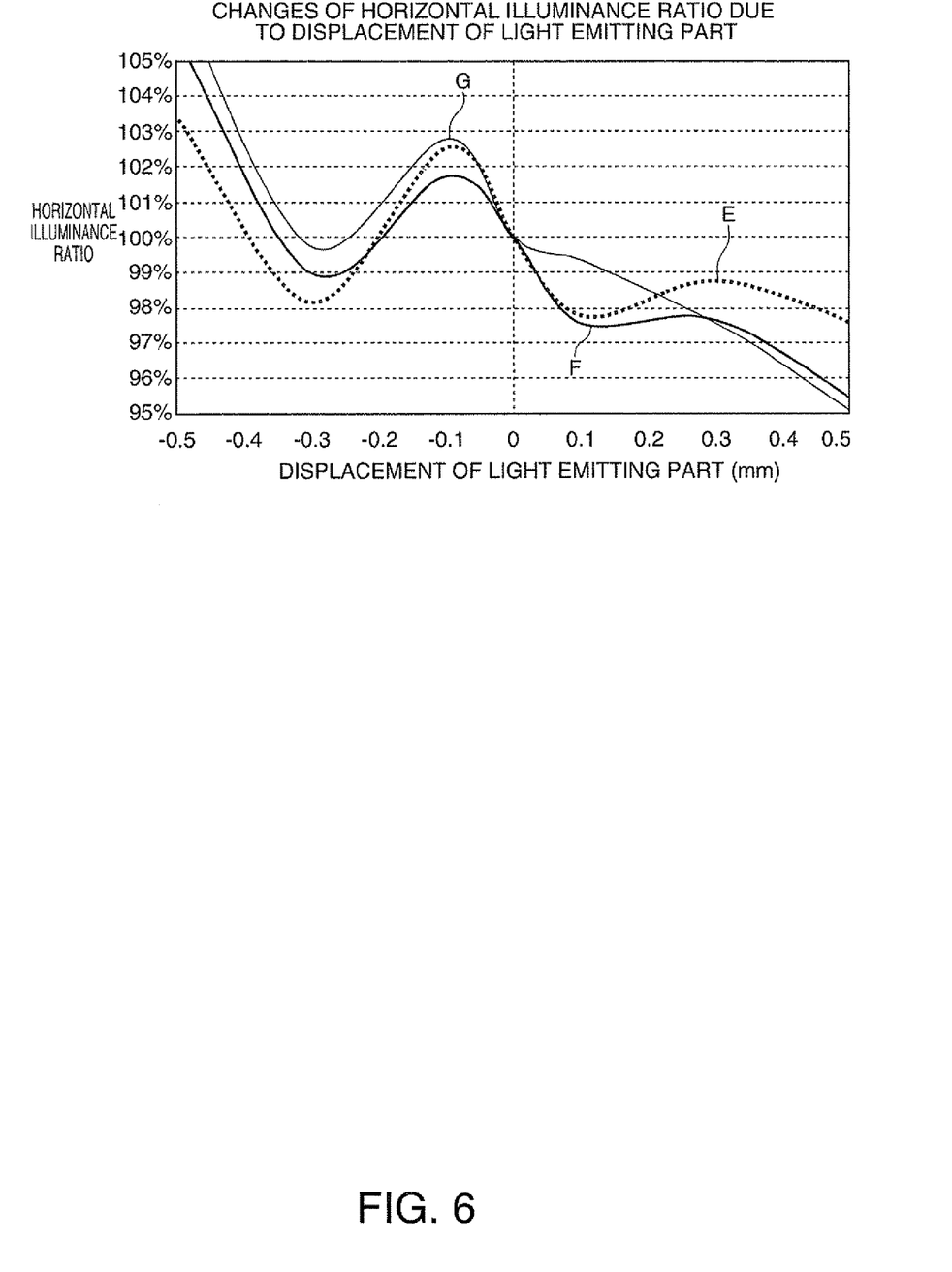
FIG. 6 is a graph showing changes of horizontal illuminance ratios due to displacement of light emitting parts in projectors 1000e, 1000f, 1000g according to test examples.

FIG. 6 is a graph showing changes of horizontal illuminance ratios due to displacement of light emitting parts in projectors 1000e, 1000f, 1000g according to test examples.

As test examples, simulations of evaluating changes of brightness irregularities due to displacement of the light emitting part in the horizontal direction (x-axis direction), particularly from horizontal illuminance ratios were done on a projector 1000a defined in the invention, projectors 1000b, 1000c, 1000d, 1000e, 1000f, 1000g having the same configurations as the projectors in related art.

"Horizontal illuminance ratio" in the test examples refers to a value obtained, in a projection image L formed by projecting a certain monochromatic light (corresponding to green light or blue light in the test examples) without modulating it by a liquid crystal light modulation device, given that a region of the left one-third of the projection image L is L1, a region of the right one-third of the projection image L is L2, by dividing the average brightness (average illuminance) of L1 by the average illuminance of L2. The projectors 1000a to 1000g are set so that the average illuminance of L1 and the average illuminance of L2 may be equal when there is no displacement of the light emitting part (displacement is 0 mm).

In the respective graphs in FIGS. 4 to 6, the longitudinal axis indicates the horizontal illuminance ratio with reference to the horizontal illuminance ratio when there is no displacement in the light emitting part (100%), and the lateral axis indicates the displacement of the light emitting part in the horizontal direction in units of millimeters. Realistically, the displacement of the light emitting part often falls in a range from −0.3 mm to 0.3 mm.

The simulations were done assuming that the projectors 1000a to 1000g (not shown) basically have the same configuration as that of the projector 1000 according to the embodiment 1 except the radii of curvature of first small lenses. As below, the respective projectors will be explained.

The projector 1000a includes a first lens array 120a (not shown) having plural first small lenses 122a (not shown). The radii of curvature of the first small lenses 122a were set with respect to each first small lens 122a, and they were set as follows: (see FIG. 2 for small lens numbers).

a-1, b-1, c-1, d-1, e-1, f-1, a-8, b-8, c-8, d-8, e-8, f-8 ... 7.8 mm a-2, b-2, c-2, d-2, e-2, f-2, a-7, b-7, c-7, d-7, e-7, f-7 ... 8.0 mm a-3, b-3, c-3, d-3, e-3, f-3, a-6, b-6, c-6, d-6, e-6, f-6 ... 8.3 mm a-4, b-4, c-4, d-4, e-4, f-4, a-5, b-5, c-5, d-5, e-5, f-5 ... 7.7 mm

The curve indicated by the sign A in FIG. 4 shows changes of a horizontal illuminance ratio due to displacement of the light emitting part in the projector $1000a$.

On the other hand, the projectors $1000b$ to $1000g$ are set so that the radii of curvature of the first small lens may be the same among all of the first small lenses.

The radius of curvature of the first small lens $122b$ (not shown) in the projector $1000b$ is 7.8 mm. The curve indicated by the sign B in FIG. 5 shows changes of a horizontal illuminance ratio due to displacement of the light emitting part in the projector $1000b$.

The radius of curvature of the first small lens $122c$ (not shown) in the projector $1000c$ is 7.9 mm. The curve indicated by the sign C in FIG. 5 shows changes of a horizontal illuminance ratio due to displacement of the light emitting part in the projector $1000c$.

The radius of curvature of the first small lens $122d$ (not shown) in the projector $1000d$ is 8.0 mm. The curve indicated by the sign D in FIG. 5 shows changes of a horizontal illuminance ratio due to displacement of the light emitting part in the projector $1000d$.

The radius of curvature of the first small lens $122e$ (not shown) in the projector $1000e$ is 8.1 mm. The curve indicated by the sign E in FIG. 6 shows changes of a horizontal illuminance ratio due to displacement of the light emitting part in the projector $1000e$.

The radius of curvature of the first small lens $122f$ (not shown) in the projector $1000f$ is 8.2 mm. The curve indicated by the sign F in FIG. 6 shows changes of a horizontal illuminance ratio due to displacement of the light emitting part in the projector $1000f$.

The radius of curvature of the first small lens $122g$ (not shown) in the projector $1000g$ is 8.3 mm. The curve indicated by the sign G in FIG. 6 shows changes of a horizontal illuminance ratio due to displacement of the light emitting part in the projector $1000g$.

It is known that, as results of the simulations, as shown in FIGS. 4 to 6, in the projector $1000a$ defined in the invention, changes of the horizontal illuminance ratio due to displacement of the light emitting part is smaller than those in the projectors $1000b$, $1000c$, $1000d$, $1000e$, $1000f$, $1000g$ having the same configurations as the projectors in related art. From the results, according to the projector of the invention, it has been confirmed that "the in-plane light intensity irregularities of light applied to the light modulation devices due to displacement of the light emitting part" can be reduced by setting radii of curvature of the first small lenses with respect to each first small lens, and, as a result, a projection image with less brightness irregularities than that in related art can be projected.

Note that, in the test examples, the displacement in the horizontal direction (x-axis direction) of the light emitting part has been described, however, the same applies to the displacement in the vertical direction (y-axis direction) of the light emitting part.

As described above, the invention has been explained based on the above embodiment, however, the invention is not limited to the above embodiment. The invention may be implemented in various forms without departing from the scope thereof and, for example, the following modifications may be made.

1. The dimensions, numbers, materials, and shapes of the respective component elements described in the embodiment have been shown for illustrative purpose, and they may be changed in a range in which the advantages of the invention are not lost.

2. In the embodiment, the first small lenses $122$ of plano-convex lenses having the spherical curved surfaces have been used, however, the invention is not limited to those. For example, first small lenses of plano-convex lenses having curved surfaces for which the radius of curvature in the row direction (x-axis direction) and the radius of curvature in the column direction (y-axis direction) are separately set may be used. According to the configuration, "the in-plane light intensity irregularities of light applied to the light modulation devices due to displacement of the light emitting part" can be reduced by setting the radii of curvature with respect to both directions of the row direction and the column direction, and, as a result, a projection image with less brightness irregularities can be projected.

3. In the embodiment, the liquid crystal light modulation devices $400R$, $400G$, $400B$ that modulate red light, green light, and blue light, respectively, have been used, however, the invention is not limited to those. Liquid crystal light modulation devices that modulate other color lights (yellow light etc.) may be used.

4. In the embodiment, a light source further including a secondary mirror that reflects a part or whole of light not directly entering the reflector of the light output from the light emitting part may be used.

5. In the embodiment, the reflector having the reflection surface of the ellipsoidal surface has been used, however, the invention is not limited to that. For example, a reflector having a reflection surface of a paraboloidal surface may be used. In this case, parallel light can be output from the reflector, and thus, it is not necessary to provide an optical element corresponding to the concave lens $90$ in the embodiment.

6. In the embodiment, the transmissive-type projector has been used, however, the invention is not limited to that. For example, a reflective-type projector may be used. Here, "transmissive-type" refers to a type in which a light modulation device as light modulating means transmits light like a transmissive liquid crystal display device or the like, and "reflective-type" refers to a type in which a light modulation device as light modulating means reflects light like a reflective liquid crystal display device or the like. In the case where the invention is applied to the reflective-type projector, the same advantages as those of the transmissive-type projector may be obtained.

7. In the embodiment, the liquid crystal light modulation device has been used as the light modulation device of the projector, however, the invention is not limited to that. As the light modulation device, generally, any one that modulates incident light in response to image information may be used, and a micromirror light modulation device or the like may be used. As the micromirror light modulation device, for example, a DMD (digital micromirror device) (trademark of TI) may be used.

8. In the embodiment, the projector using three liquid crystal light modulation devices has been explained as an example, however, the invention is not limited to that. The invention may be applied to a projector using one, two, four, or more liquid crystal light modulation devices.

9. The invention may be applied to both a front-projection projector that projects a projection image from an observation side and a rear-projection projector that projects a projection image from an opposite side to the observation side.

The entire disclosure of Japanese Patent Application No. 2011-006677, filed Jan. 17, 2011 is expressly incorporated by reference herein.

What is claimed is:

1. A projector comprising:
an illumination device including a light source that outputs light from a light emitting part, a first lens array having plural first small lenses, a second lens array having plural second small lenses corresponding to the plural first small lenses, and a superimposing lens that superimposes lights from the second lens array, the light emitting part being displaceable within a range of distance of from −0.3 mm to 0.3 mm;
a light modulation device that modulates light from the illumination device in response to image information; and
a projection system that projects the light from the light modulation device on a projection target,
wherein radii of curvature of the first small lenses are set with respect to each of the first small lenses so as to reduce in-plane light intensity irregularities of light applied to the light modulation device due to displacement of the light emitting part within the range of distance, and to reduce a change of a horizontal illuminance ratio due to displacement of the light emitting part within the range of distance, and the radii of curvature of at least two of the first small lenses are set to be different from each other.

2. The projector according to claim 1, wherein the light emitting part outputs light containing red light, green light, and blue light,
three light modulation devices that respectively modulate the red light, the green light, and the blue light are provided as the light modulation device,
a guiding optical system that guides the red light, the green light, and the blue light to the three light modulation devices is further provided, and
the lights are projected on the projection target with an in-plane light intensity distribution of one color light of the red light, the green light, and the blue light inverted relative to in-plane light intensity distributions of the other color lights.

3. The projector according to claim 1, wherein the light source includes an arc tube that contains the light emitting part.

4. The projector according to claim 1, wherein the first small lens is a plano-convex lens having a spherical curved surface.

5. The projector according to claim 1, wherein the first small lens is a plano-convex lens,
the plural first small lenses are arranged in a matrix, and
a curved surface of the plano-convex lens is a curved surface for which a radius of curvature in a row direction and a radius of curvature in a column direction are separately set.

* * * * *